US008670565B2

(12) United States Patent
Matsuki et al.

(10) Patent No.: US 8,670,565 B2
(45) Date of Patent: Mar. 11, 2014

(54) ENCRYPTED PACKET COMMUNICATION SYSTEM

(75) Inventors: Josuke Matsuki, Yugawara (JP); Masashi Takatsuki, Fujisawa (JP); Yukihiro Shimmura, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1506 days.

(21) Appl. No.: 11/965,839

(22) Filed: Dec. 28, 2007

(65) Prior Publication Data
US 2008/0181404 A1     Jul. 31, 2008

(30) Foreign Application Priority Data

Jan. 26, 2007 (JP) .................................. 2007-016242

(51) Int. Cl.
*H04L 9/00* (2006.01)
*H04L 9/08* (2006.01)
*H04L 29/06* (2006.01)
*H04K 1/00* (2006.01)

(52) U.S. Cl.
USPC ........... 380/259; 380/255; 380/282; 713/150; 713/153

(58) Field of Classification Search
USPC .................. 380/255, 259, 282; 713/150, 153
See application file for complete search history.

(56) References Cited

U.S. PATENT DOCUMENTS

| | | | | |
|---|---|---|---|---|
| 5,812,671 A | * | 9/1998 | Ross, Jr. ........................ | 713/153 |
| 6,084,969 A | * | 7/2000 | Wright et al. ................ | 380/271 |
| 6,167,513 A | * | 12/2000 | Inoue et al. .................... | 713/150 |
| 6,185,680 B1 | * | 2/2001 | Shimbo et al. ................ | 713/160 |
| 6,353,886 B1 | * | 3/2002 | Howard et al. ............... | 713/156 |
| 7,546,468 B2 | * | 6/2009 | Fujiwara et al. .............. | 713/176 |
| 7,983,419 B2 | * | 7/2011 | Fan et al. ....................... | 380/255 |

FOREIGN PATENT DOCUMENTS

| | | |
|---|---|---|
| JP | 9-191318 | 7/1997 |
| JP | 2001-111612 | 4/2001 |

OTHER PUBLICATIONS

S. Kent et al., Security Architecture for the Internet Protocol, Network Working Group, Nov. 1998.
D. Harkins, The Internet Key Exchange, Network Working Group, Nov. 1998.

* cited by examiner

*Primary Examiner* — Saleh Najjar
*Assistant Examiner* — Oleg Korsak
(74) *Attorney, Agent, or Firm* — Antonelli, Terry, Stout & Kraus, LLP.

(57) ABSTRACT

The communications between terminals are encrypted, and even a gateway device is permitted to analyze the encrypted communications, thereby to incarnate censorship for the prevention of information leakage.
A gateway device 3 prepares a public key and a secret key in a pair on the basis of a public key encryption system, and distributes the public key to terminals 2a-2c which are managed by the gateway device 3. The terminals 2a-2c subject a communication packet to a prior-art common key encryption, and they thereafter encrypt a common key with the public key and bestow the encrypted common key on the packet. The gateway device 3 decrypts the common key by using the secret key, censors the packet and returns the packet into a prior-art encrypted packet format, and it thereafter transfers the packet to a network 1c where opposite terminals 2d-2f exist.

5 Claims, 11 Drawing Sheets

ENCRYPTED PACKET COMMUNICATION SYSTEM

BACKGROUND OF THE INVENTION

The present invention relates to an encrypted packet communication system, and more particularly to an encrypted packet communication system for censoring encrypted packets in encrypted communications on a network as employ the IP (Internet Protocol) or the like as a communication protocol.

In recent years, with the "IPization" of communication networks, IP communication networks centering round the Internet have been extensively utilized as a social infrastructure. Besides, in packet communications on the Internet as contain individual information, commercial transaction information, etc., it has become indispensable to ensure the security of a communication path for the purpose of defending against wiretaps and alterations.

As a technique concerning the communication security on the Internet, there has been well known "Security Architecture for the Internet Protocol" which is a technique discussed by IETF (The Internet Engineering Task Force) (refer to Non-Patent Document 1 being S. Kent and R. Atkinson: "Security Architecture for the Internet Protocol", RFC2401, November 1998).

By the way, in the IPv6 (Internet Protocol ver. 6) the wide use of which is anticipated in the future, it is prescribed to perform the standard installation of the IPsec (IP security Protocol), and an IPsec facility is presently mounted on products adapted for the IPv6. Further, it is predicted that the number of connected terminals and the number of users will increase with the all "IPization" of communication networks, and that an access configuration will become complicated therewith.

Usually, with the IPsec, an encryption process based on a common key is executed for transmission/reception packets between a transmitter and a receiver, thereby to realize secure communications. Therefore, the common key and authentication/encryption algorithm information items necessary for applying the IPsec need to be determined between the transmitter and the receiver beforehand. Regarding a technique for carrying on negotiations between IPsec processors before the start of the communications and automatically generating the above common key, there has been known "The Internet Key Exchange" (refer to Non-Patent Document 2 being D. Harkins and D. Carrel: "The Internet Key Exchange (IKE)", RFC2409, November 1998).

On the other hand, information leakage in which unintended information leaks out from an enterprise or the like organization has come to the fore. Therefore, a censoring device which serves to confirm the contents of the packets and to abolish the packets that ought not to be transferred has come into use in order to prevent the information from leaking out from a network within the organization. This device is often incorporated into a gateway which becomes the exit of the organizational network.

SUMMARY OF THE INVENTION

There was the problem that, since a gateway device does not hold a common key for packets encrypted by the IPsec technique etc. as stated above, it cannot decrypt the packets and cannot see the data parts of the packets.

In order to solve such a problem, there has been proposed a method wherein a gateway executes encryption instead of a terminal by using an IPsec tunnel mode. Thus, packets of plaintext not encrypted arrive at the gateway device, and the gateway device has become capable of seeing the contents of the packets. However, problems as indicated below have been incurred by carrying out the method.

In a case where the terminal arranged in a network within an organization has a plurality of encrypted communication destinations, the common key information items of all the plurality of opposite destinations must be held, and the required memory capacity of the gateway device enlarges.

The gateway device expends a long time on a search for fetching the plurality of common keys, and the required CPU time of the gateway device lengthens.

In the network within the organization, the packets of the plaintext not encrypted are transferred, so that a wiretap within the organization becomes possible, and the security between terminals cannot be perfectly ensured.

These are the examples of the problems of the prior art.

In view of the above points, the present invention has for its object to permit the censorship of packets which are transferred by a gateway device, without increasing a memory capacity, CPU processing and/or the like and with an ensured security among terminals within an organizational network.

In order to solve the above problems, the invention has employed both a common key encryption system and a public key encryption system. Here, the "common key encryption system" is an encryption system which employs a key that can be decrypted with only the same key as an encrypted key. Besides, the "public key encryption system" is a system wherein a pair of two keys, for example, a key A and a key B are existent, and data encrypted with the key A can be decrypted with only the key B, while data encrypted with the key B can be decrypted with only the key A. By utilizing this feature, the key A is used as a public key, and the other key B is used as a secret key.

The invention chiefly includes means for encrypting a packet with a common key, means for encrypting the common key with a public key, and means for transmitting the encrypted common key simultaneously with the encrypted packet, without omitting any information of the packet encrypted with the common key. Besides, the invention includes means for storing a secret key corresponding to the public key, means for decrypting the encrypted common key received simultaneously with the packet, with the secret key, so as to derive the common key, means for decrypting the packet with the derived common key, and means for delivering the packet as a plaintext to packet censorship means. Further, the invention can include means for returning the packet into a prior-art encrypted packet format and then transferring the packet.

According to the present invention, there is provided an encrypted packet communication system comprising a packet transmission device, a packet transfer device of a network which includes said packet transmission device, and a packet reception device within another network, wherein a packet is transmitted from said packet transmission device to said packet reception device through said packet transfer device, and wherein:

said packet transmission device includes:
means for encrypting a packet data part of the packet with a common key, thereby to create an encrypted data part and for creating a first encrypted header which contains common key identification information for searching for a common key for encryption between said packet transmission device and said packet reception device;
means for encrypting the common key with a public key, thereby to create an encrypted common key and for creating a second encrypted header which contains identification information of the encrypted common key and the public key; and means for transmitting an encrypted packet which contains the first encrypted header, the second encrypted header and the encrypted data part, to said packet transfer device; and said packet transfer device includes:

means for receiving the encrypted packet from said packet transmission device and, in a case where the received packet contains the second encrypted header, for obtaining a secret key corresponding to the public key, on the basis of the identification information of the public key in the second encrypted header, for obtaining the common key by decrypting the encrypted common key contained in the second encrypted header, with the secret key, and for deleting the second encrypted header from the encrypted packet;

means for decrypting the encrypted data part of the encrypted packet with the obtained common key, thereby to obtain the packet data part, and for further deleting the first encrypted header from the encrypted packet;

means for censoring the packet data part, thereby to judge if the packet containing the packet data part may be transferred;

means, in case of the judgment that the packet containing the packet data part may be transferred, for creating the encrypted data part by encrypting the packet data part with the common key, and for creating an encrypted packet containing a first encrypted header, which contains the encrypted data part and the first encrypted header containing the common-key identification information; and means for transmitting the encrypted packet containing the first encrypted header, to the other network.

In accordance with the invention, it is permitted to censor a packet which is transferred by a gateway device, and advantages as stated below are attained.

Since the gateway device need not hold the common key of every terminal for decrypting the encrypted packet, a gateway need not have any complicated previous key exchange protocol.

Since the gateway device need not hold the common key of every terminal for decrypting the encrypted packet, a memory for holding the common key therein is dispensed with.

Since the gateway device need not hold the common key of every terminal for decrypting the encrypted packet, a search for the common key as has been performed every arrival of the packet in the prior art is dispensed with. Consequently, a CPU resource to be used can be decreased.

Since the packet which is transferred within an organizational network managed by the gateway device is also encrypted, the packet is not wiretapped within the organizational network.

DESCRIPTION OF THE PREFERRED EMBODIMENTS OF THE INVENTION

Embodiments of the present invention will be described with reference to the drawings.

1. Encrypted Packet Censorship System

Figure 1:
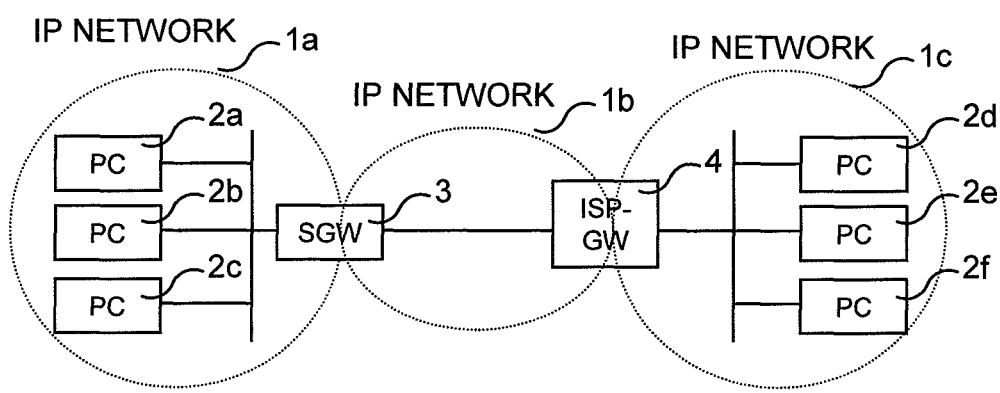
FIG. 1 is a diagram of a network architecture to which the present invention is applied.

FIG. 1 shows a network architectural diagram of an encrypted packet censorship system.

Now, an example in which the IPsec is employed as a method for encrypting packet data will be mentioned in the description of the embodiments of the invention. However, the invention is similarly applicable even in a case where any other packet encryption method is adopted in encrypting the packet data.

This diagram shows a general Internet connection configuration, in which an IP network 1b such as the Internet exists as a relay network between an IP network 1a such as an enterprise network and an IP network 1c that an ISP (Internet Service Provider) or the like provides to individual users.

An SGW (Security Gateway) 3 is disposed in order to relay the IP networks 1a and 1c. An ISP-GW (Internet Service Provider Gateway) 4 exists in order to relay the IP networks 1b and 1c. The IP network 1a includes a PC (Personal Computer) 2a, a PC 2b and a PC 2c, which are respectively connected to the SGW 3. The IP network 1c includes a PC 2d, a PC 2e and a PC 2f, which are respectively connected to the ISP-GW 4.

Figure 11:
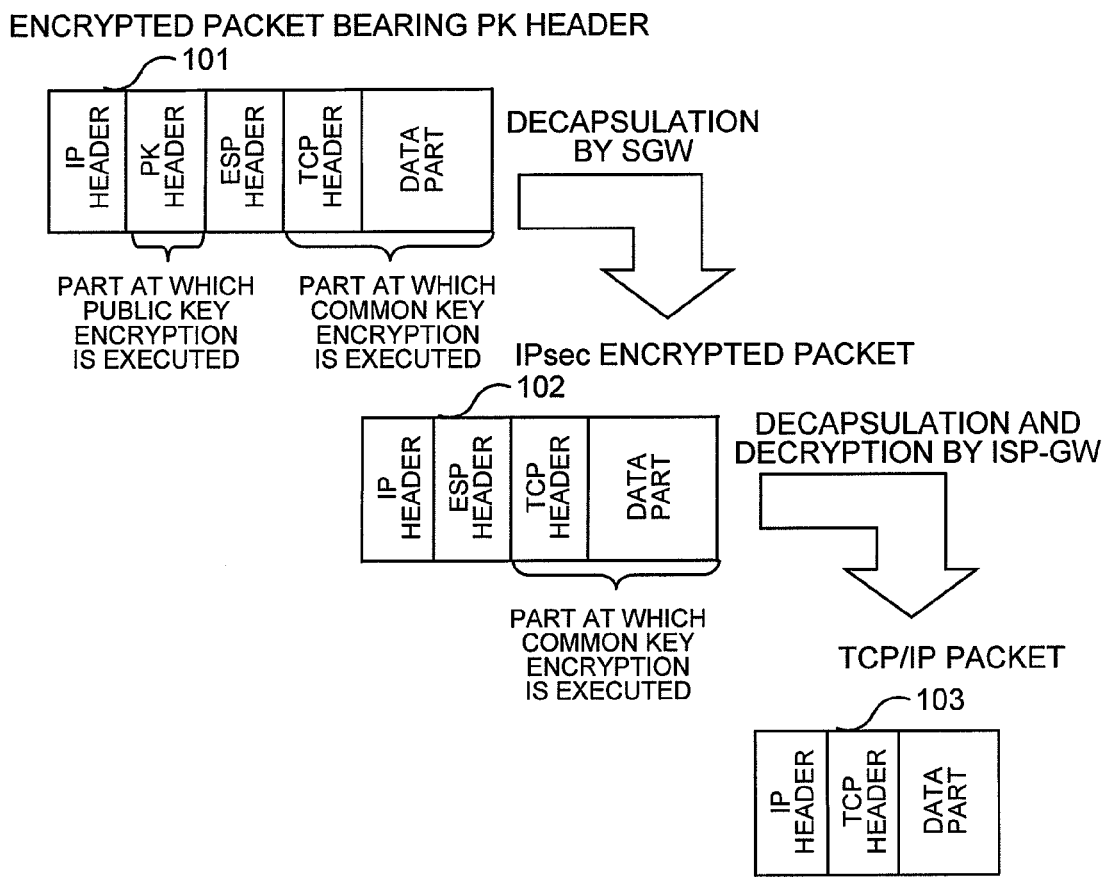
FIG. 11 is a diagram for explaining the formats of packets which are transmitted by individual IP networks.

Besides, FIG. 11 shows a diagram for explaining the formats of packets which are transmitted by the individual IP networks.

As shown in the figure, the PC 2a transmits an encrypted packet bearing a PK header, 101, and the SGW 3 decapsulates the encrypted packet bearing the PK header, 101 (for example, removes the PK header), thereby to generate an IPsec encrypted packet 102, which is transferred to the IP network 1b. Here, the IPsec encrypted packet 102 is interchangeable with an IPsec packet in the prior art, and a device which receives the IPsec encrypted packet 102 has the advantage that it does not require any special alteration for performing the invention or this embodiment. On the other hand, when the ISP-GW 4 receives the IPsec encrypted packet 102, it performs decapsulation and decryption (for example, removes an ESP header), thereby to generate a TCP/IP packet 103, which is transferred to the IP network 1c.

Now, there will be described a case where the PC 2a transmits the IP packet encrypted with the IPsec, to the PC 2d in the architecture shown in FIG. 1.

2. User Terminal Device (PC)

Figure 2:
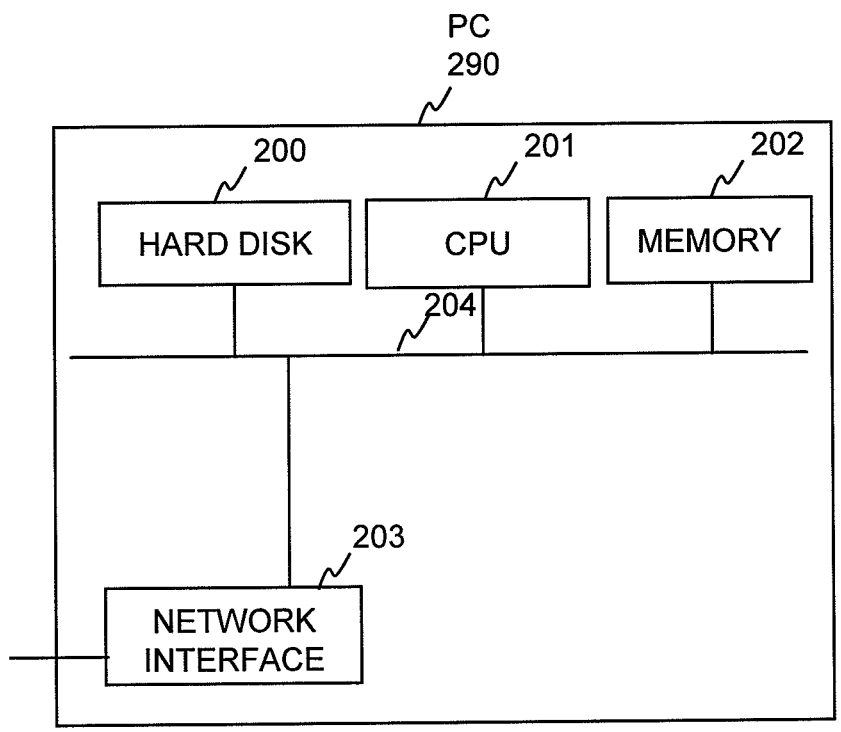
FIG. 2 is a hardware configurational diagram of a user terminal device.

FIG. 2 is a device configurational diagram of the user terminal device. Incidentally, each of the user terminal devices PC 2a, PC 2b and PC 2c has the same configuration.

The PC 2a includes, at least, four hardware blocks. The individual hardware blocks will be described below.

Hard disk 200 which stores therein the information items of software, setting files for determining the operation of this device, etc.

CPU 201 which governs the control of this device.

Memory 202 which is a region that is temporarily utilized in executing the software.

Network interface 203 which transmits IP packets.

The above hardware blocks are all connected by a bus 204.

Figure 3:
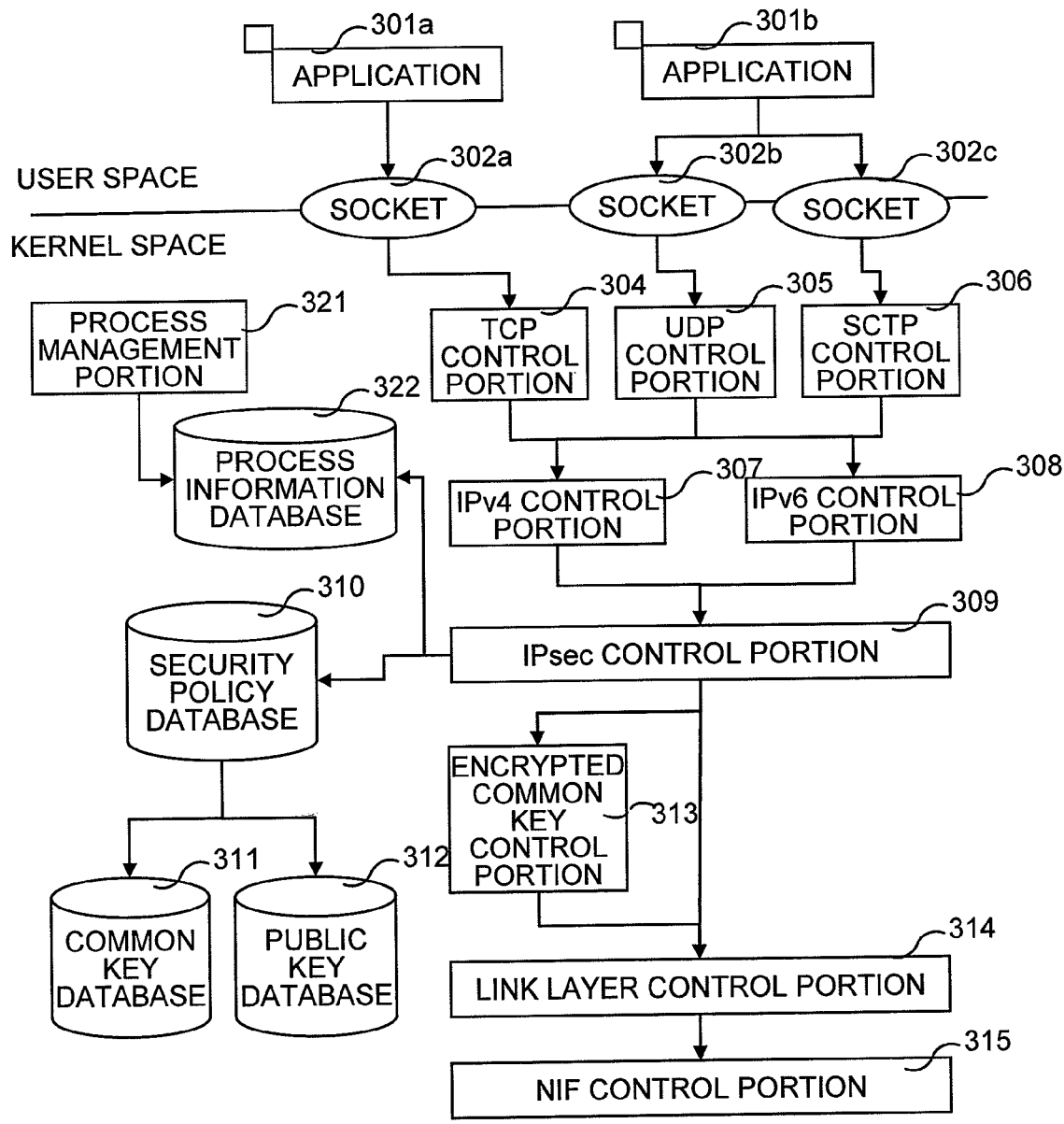
FIG. 3 is an explanatory diagram showing the software configuration of the user terminal device.

FIG. 3 is an explanatory diagram showing the software configuration of the user terminal device. Incidentally, each of the user terminal devices PC 2a, PC 2b and PC 2c has the same configuration.

The user terminal device includes application programs 301a and 301b. Socket interfaces 302a, 302b and 302c transmit data packets from a user space to a kernel space. A TCP control portion 304 adds a TCP header to the data packet, and performs a connection management. A UDP control portion 305 adds a UDP header to the data packet. An SCTP control portion 306 adds an SCTP header to the data packet, and performs a connection management. An IPv4 control portion 307 bestows an IPv4 header on the packet from an upper layer of TCP, UDP, SCTP or the like. An IPv6 control portion 308 bestows an IPv6 header likewise to the IPv4 control portion 307.

An IPsec control portion 309 encrypts the IP packet, and bestows an IPsec header on the IP packet. A security policy database 310 judges if the IPsec control portion 309 ought to apply the IPsec to the packet built by the IPv4 control portion 307 or the IPv6 control portion 308. A common key database 311 holds therein a common key for the IPsec encryption of the packet. A public key database 312 holds therein a public key for the encryption of the common key. An encrypted common key control portion 313 bestows a result obtained by encrypting the common key with the public key, on the packet built by the IPsec control portion 309.

A link layer control portion 314 bestows an MAC address on the packet built by the encrypted common key control portion 313 or the IPsec control portion 309. An NIF control portion 315 controls a network interface device.

A process management portion 321 controls which process is to be executed by the CPU 201 within a unit time. In a process information database 322, the process management portion 321 stores all process-under-execution information items.

Figure 4:
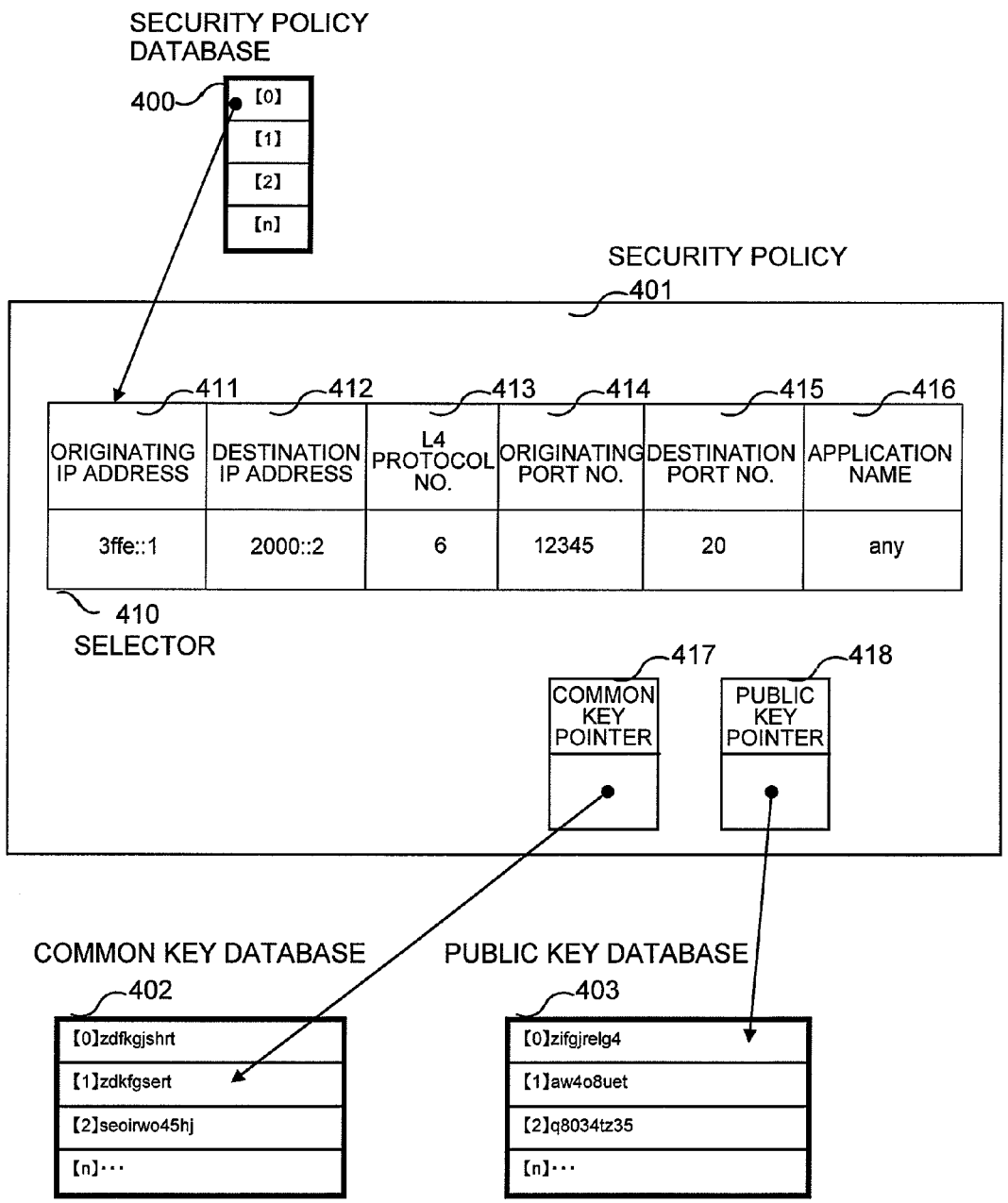
FIG. 4 is an explanatory diagram showing the relationships among a security policy database, a common key database and a public key database.

FIG. 4 is an explanatory diagram showing the structures of and the relationships among the security policy database 310, the common key database 311 and the public key database 312.

A security policy database 400 corresponds to the security policy database 310 in FIG. 3. A security policy 401 is pointed from the security policy database 400. The security policy database 400 can store a plurality of security policies 401 therein.

The security policy 401 includes a selector 410, a common key pointer 417 and a public key pointer 418. The security policy database 400 compares an originating IP address 411, a destination IP address 412, an L4 protocol No. 413, an originating port No. 414 and a destination port No. 415 which are contained in the selector 410 and which are information items contained in the packet built by the IPv4 control portion 307 or the IPv6 control portion 308, respectively, and it can search for and acquire data as to which all the above items agree. However, in a case where "any" is designated for one or more of the originating IP address 411, destination IP address 412, L4 protocol No. 413, originating port No. 414 and destination port No. 415, the item/items designated as "any" is/are not searched for. Incidentally, by way of example, the originating IP address 411, destination IP address 412 and L4 protocol No. 413 are contained in an IP header, and the originating port No. 414 and destination port No. 415 are contained in the TCP header.

Alternatively, the security policy database 400 compares the name of the application having sent the packet, with an application name 416, and it can acquire the application name having agreed. However, in a case where the application name 416 is designated as "any", the search based on the application name is not made. Further, the security policy database 400 may well compare all the information items of the originating IP address 411—the application name 416.

The search based on the application name can be made by comparisons with the process information which is managed by the process management portion 321 of an OS (operating system) The word "process" signifies a program which is under execution in the OS. The process management portion 321 records the process being currently executed by the CPU 201, in the process information database 322 as "under execution". Therefore, any functional portion can know the process information being currently executed by the CPU 201, by searching the process information database 322. Since the application name is also contained in the process information, the IPsec control portion 309 searches the process information database 322 so as to acquire the application name for the character string comparison with the application name 416. According to this expedient, the application 301a or 301b need not convey its own application name to the IPsec control portion 309, to bring forth the advantage that an interface need not be created.

A common key database 402 corresponds to the common key database 311 in FIG. 3, and it holds a plurality of common keys therein. The common key is used for the IPsec encryption. Since the security policy 401 holds the common key pointer 417 for the common key, the common key can be accessed by acquiring the security policy 401.

A public key database 403 corresponds to the public key database 312 in FIG. 3, and it holds a plurality of public keys therein. The public key is used for the encryption of the common key. Since the security policy 401 holds the public key pointer 418 for the common key, the public key can be accessed by acquiring the security policy 401. An idle pointer can also be designated as the public key pointer 418. In a case where the idle pointer is designated, the common key is not bestowed on the packet.

Figure 5:
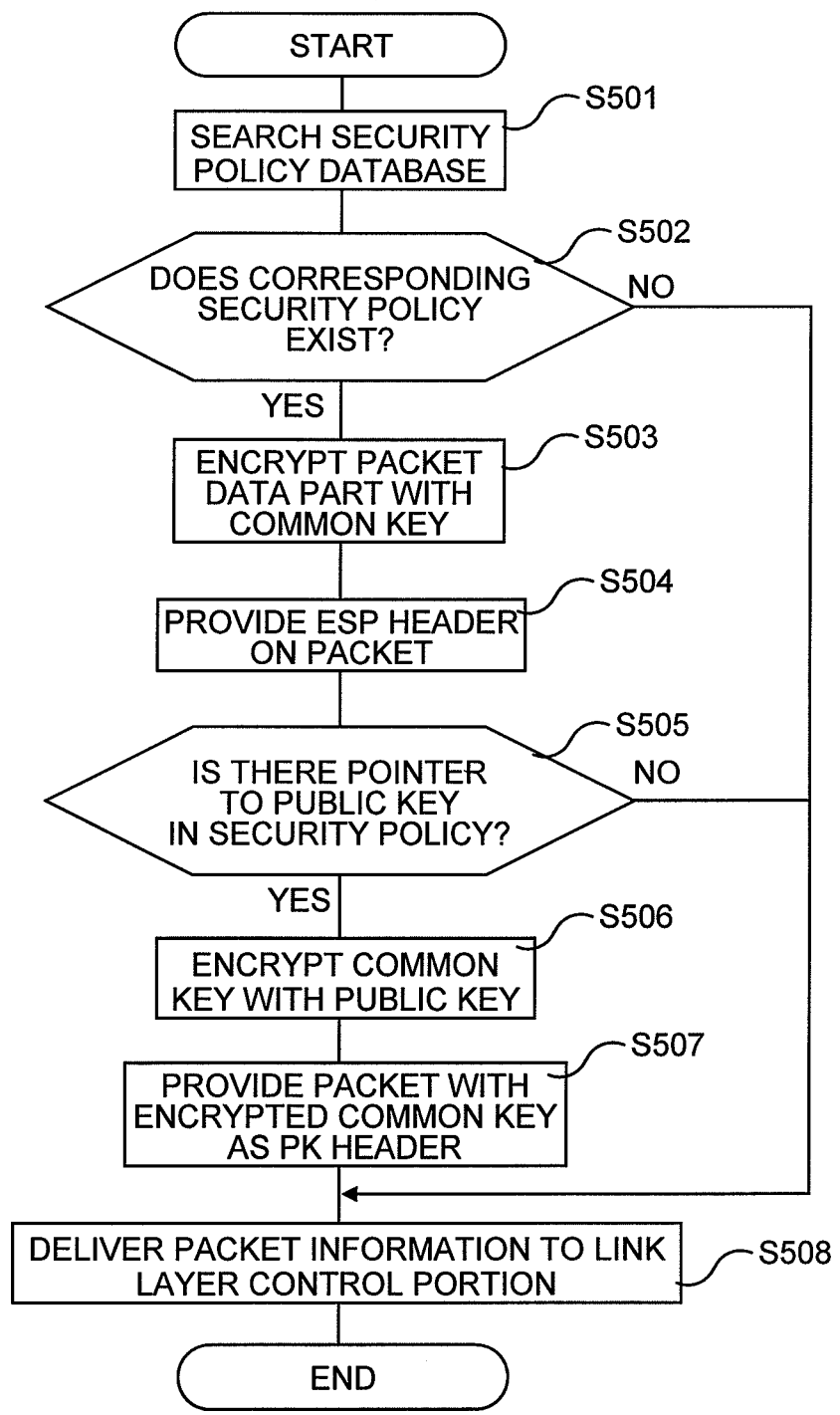
FIG. 5 is a flow chart of the packet transmission process of the user terminal device.
Figure 6:
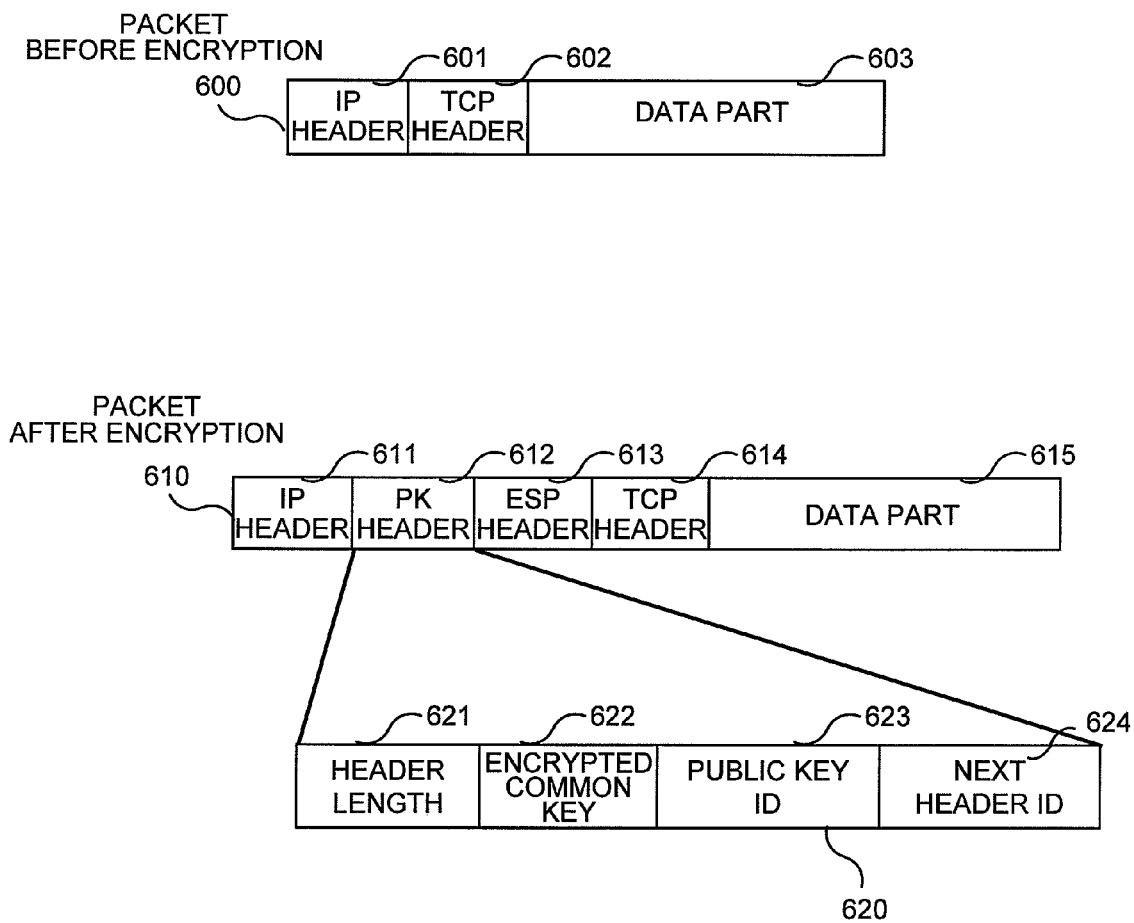
FIG. 6 is an explanatory diagram showing the formats of packets which the user terminal device transmits and receives.

FIG. 5 is an explanatory diagram showing the flow of the packet transmission process of the user terminal device. Besides, FIG. 6 is an explanatory diagram showing the formats of the packets which the user terminal device transmits and receives. Next, the operations of the IPsec control portion 309 and the encrypted common key control portion 313 which perform the packet encryption in the user terminal device PC 2a will be described more concretely with reference to FIGS. 5 and 6.

When the IPsec control portion 309 receives the packet from the IPv4 control portion 307 or the IPv6 control portion 308, it searches the security policy database 310 on the basis of an IP header 601 and a TCP header 602, or transmission source application information acquired from the process information database 322, so as to acquire the security policy 401 corresponding to the selector 410 (step S501).

In a case where the corresponding security policy 401 does not exist, the IPsec control portion 309 does not execute an IPsec process (step S502). On the other hand, in a case where the corresponding security policy 401 exists, the IPsec control portion 309 encrypts the TCP header part 602 and data part 603 of the packet with the common key which is stored in the common key database 402 pointed by the common key pointer 417 (step S503). Besides, the IPsec control portion 309 creates an ESP header 613 in which the common key ID of the IPsec is contained, and it bestows the ESP header 613 on the encrypted packet so that the common key for decryption can be searched for by the PC 2d being a reception side (step S504). The "common key ID" is an ID for identifying the common key with which any data has been encrypted, and it is also called an "SPI (Security Parameter Index)" in the IPsec system.

Subsequently, in a case where the public key pointer 418 contained in the security policy 401 searched for at the step S501 is idle (step S505), the IPsec control portion 309 delivers the packet encrypted with the common key, to the link layer control portion 314 (S508), and the link layer control portion 314 makes a request for transmission.

On the other hand, in a case where the public key pointer 418 contained in the security policy 401 searched for at the step S501 points the address of the public key contained in the public key database 403 (step S505), the IPsec control portion 309 delivers the packet in which a data part 615 and a TCP header 614 have been encrypted with the common key, to the encrypted common key control portion 313, and the encrypted common key control portion 313 encrypts the common key with the corresponding public key (step S506). The encrypted common key control portion 313 endows the packet with a PK header 612 which contains a public key ID 623 with which the common key has been encrypted, and the encrypted common key 622 (step S507). The encrypted common key control portion 313 delivers the packet subjected to the above processing (encrypted packet bearing the PK header, in FIG. 11), to the link layer control portion 314, and the link layer control portion 314 requests the device to transmit the packet (step S508).

3. Security Gateway (SGW)

Next, there will be described the SGW 3 which censors a packet.

Figure 7:
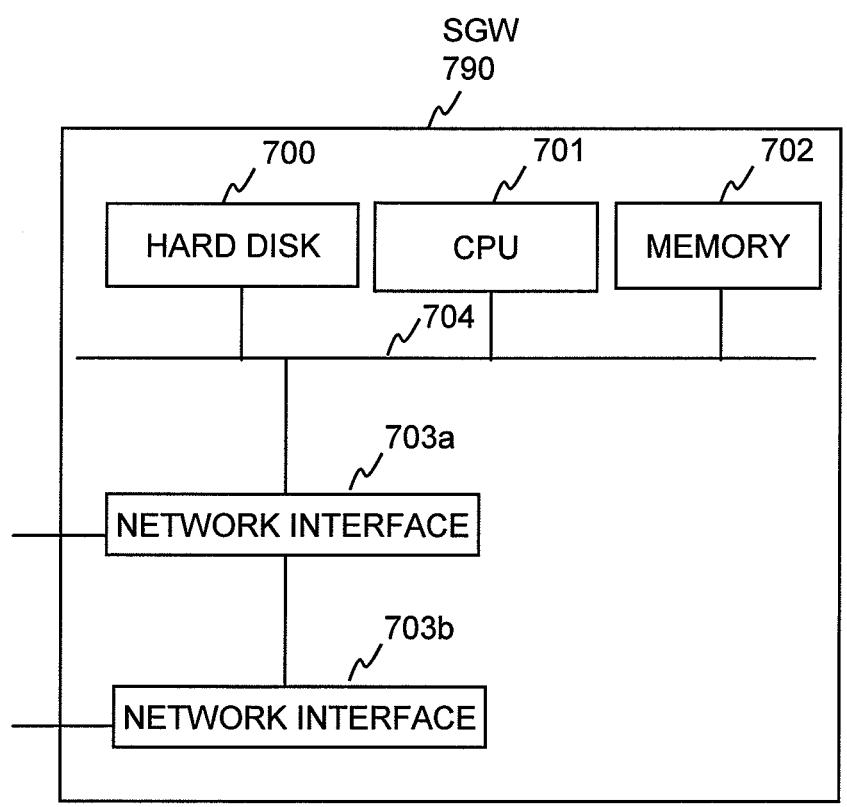
FIG. 7 is an explanatory diagram showing the hardware configuration of a security gateway.

FIG. 7 is a device configurational diagram of the SGW 3. The SGW 3 includes, at least, five hardware blocks. The individual hardware blocks will be described below.

Hard disk 700 which stores therein the information items of software, setting files for determining the operation of this device, etc.

CPU 701 which governs the control of this device.

Memory 702 which is a region that is temporarily utilized in executing the software.

Network interfaces 703a and 703b which transmit IP packets.

The above hardware blocks are all connected by a bus 704.

Figure 8:
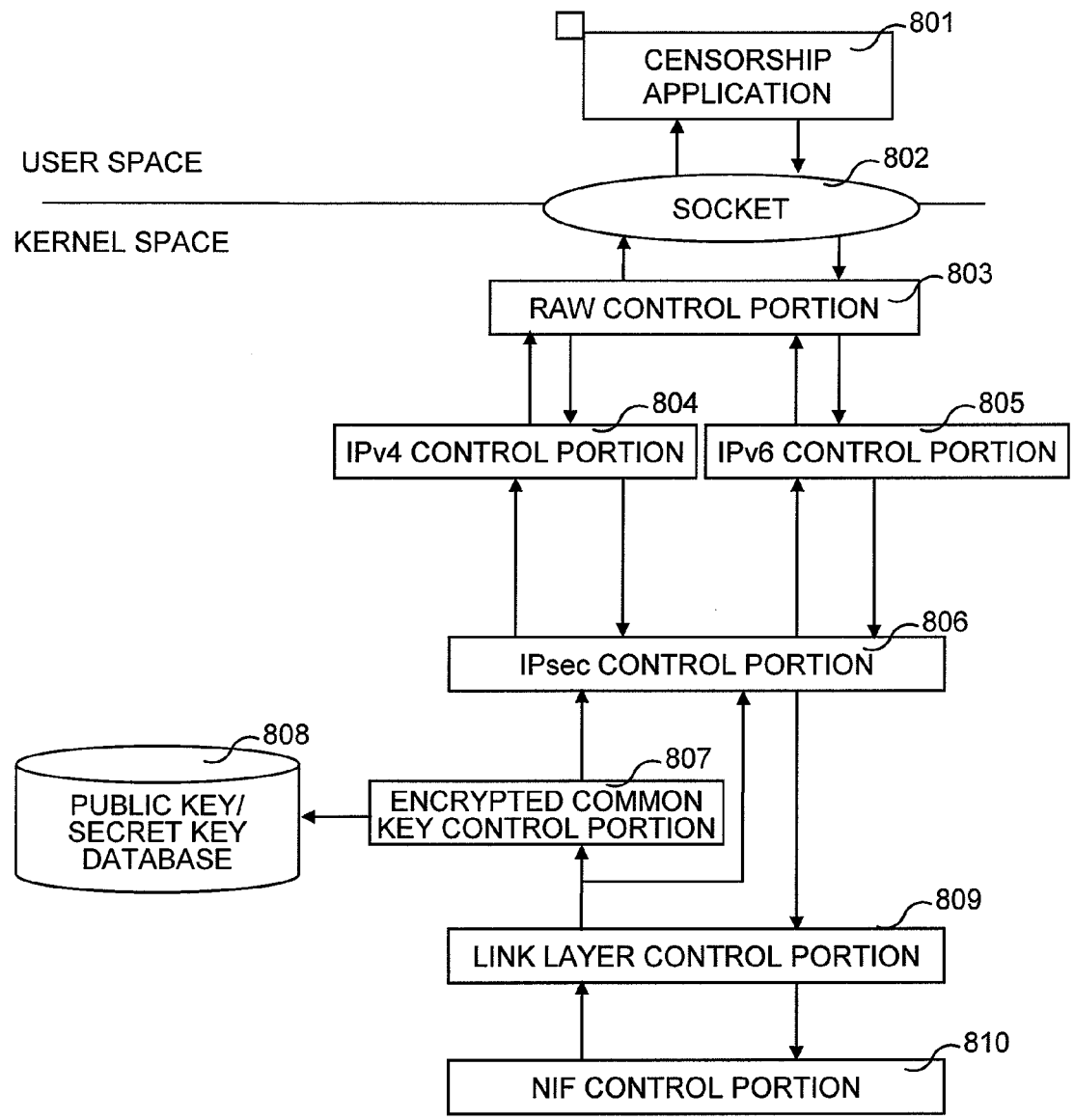
FIG. 8 is an explanatory diagram showing the software configuration of the security gateway.

FIG. 8 is an explanatory diagram showing the software configuration of the SGW 3. The SGW 3 includes an application program 801 for censoring a packet. A socket interface 802 delivers the packet from a kernel space to a user space or vice versa. An RAW control portion 803 delivers a packet containing an IP header 610, to the socket 802. Besides, the RAW control portion 803 delivers a packet from the socket 802 to an IPv4 control portion 804 or an IPv6 control portion 805. The IPv4 control portion 804 performs a control for transferring an IPv4 packet to another interface, and it creates a copy of the packet and delivers the copied packet to the RAW control portion 803. The IPv6 control portion 805 performs a control for transferring an IPv6 packet to another interface, and it creates a copy of the packet and delivers the copied packet to the RAW control portion 803. Besides, the IPv4 control portion 804 and the IPv6 control portion 805 deliver the packets received from the RAW control portion 803, to an IPsec control portion 806.

The IPsec control portion 806 decrypts the encrypted data part 615 and TCP header 614 of the received packet, with a common key, and removes the ESP header 613. Thereafter, the IPsec control portion 806 transmits the packet to the IPv4 control portion 804 and the IPv6 control portion 805. Incidentally, the IPsec control portion 806 may well hold the decrypted common key therein. Besides, the IPsec control portion 806 bestows the ESP header on the packet received from the IPv4 control portion 804 or the IPv6 control portion 805. An encrypted common key control portion 807 decrypts the common key 622 encrypted in the PK header 612 of the received packet, and removes the PK header. Thereafter, the encrypted common key control portion 807 delivers the packet from which the decrypted common key and the PK header have been removed, to the IPsec control portion 806. A public key/secret key database 808 stores therein a public key which has been sent to the PC 2a, and a secret key which pairs with the public key. The public key and the secret key which form the pair have an identical ID.

A link layer control portion 809 judges whether the received packet is to be processed by the IPv4 control portion 804 or by the IPv6 control portion 805, and it notifies the judged result to the encrypted common key control portion 807 or the IPsec control portion 806. Besides, the link layer control portion 809 delivers the packet from the IPsec control portion 806 to an NIF control portion 810. The NIF control portion 810 derives received packet information from the network interface 703a or 703b, and shifts the packet information into the memory 702 so as to be handleable by software. Besides, the NIF control portion 810 transmits the packet from the link layer control portion 809, to a link layer through the network interface 703a or 703b.

Figure 9:
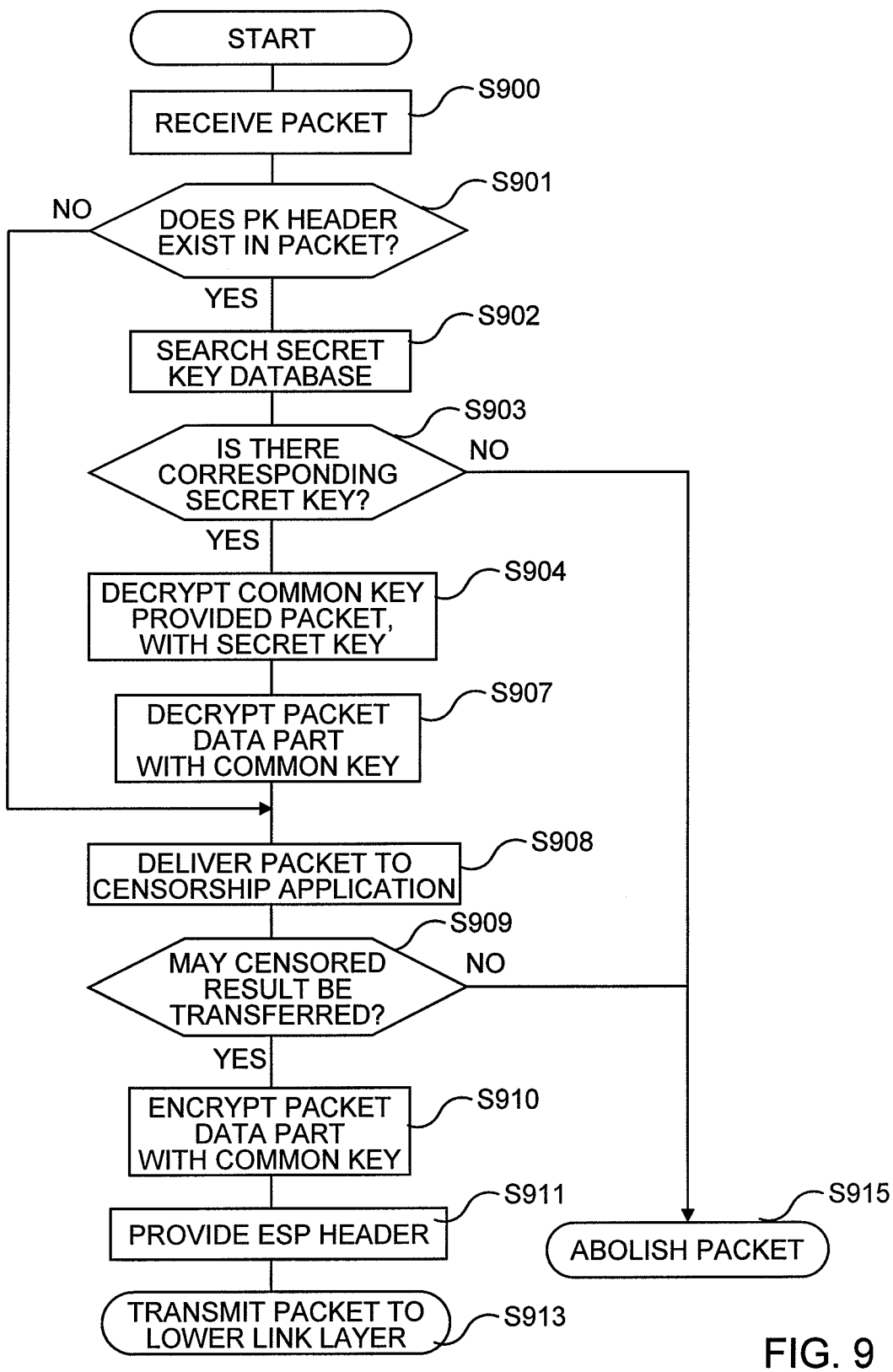
FIG. 9 is a flow chart of the packet censorship and transfer of the security gateway.
Figure 10:
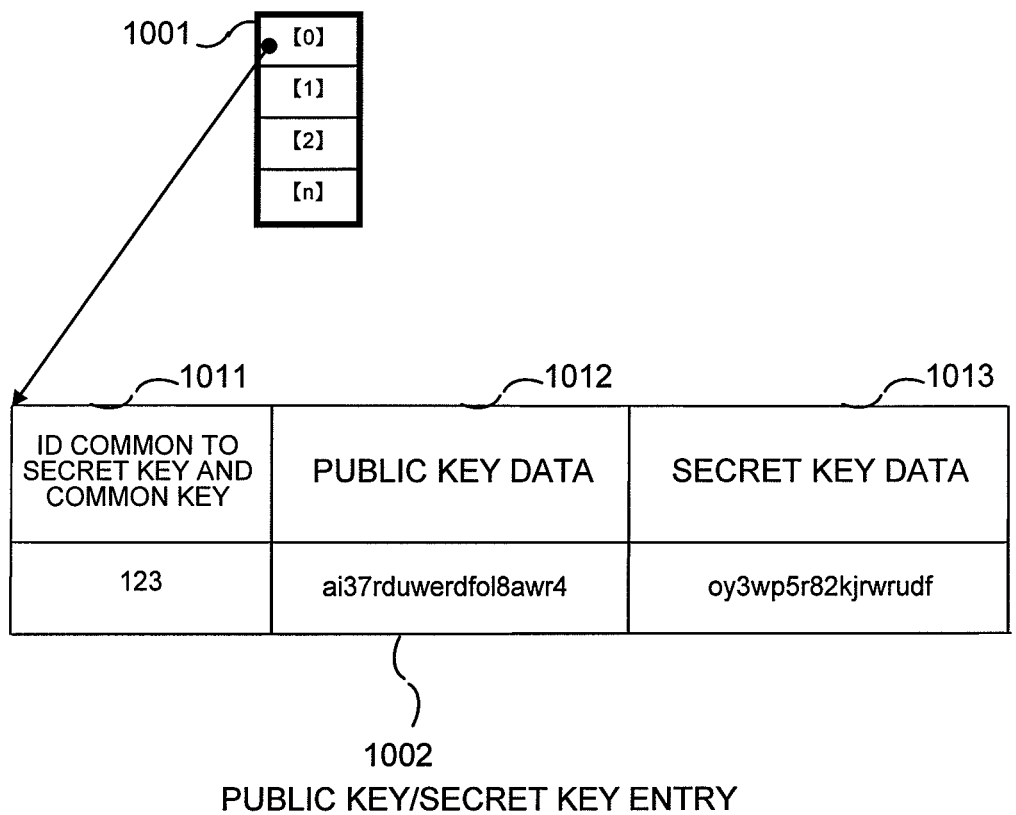
FIG. 10 is an explanatory diagram showing the configuration of a database 808 in which public keys and secret keys are kept stored.

FIG. 9 is an explanatory diagram showing a flow chart of the packet censorship and transfer of the security gateway. Besides, FIG. 10 is an explanatory diagram showing the configuration of the database 808 in which the public keys and the secret keys are kept stored. Next, a method in which the encrypted packet 610 received from the PC 2a is transferred as an IPsec encrypted packet will be described more concretely with reference to FIGS. 9 and 10.

The NIF control portion 810 stores the packet received from the network interface 703a or 703b (the encrypted packet bearing the PK header, in FIG. 11) in the memory 702 beforehand. The link layer control portion 809 reads out the packet received from the memory 702, and the encrypted common key control portion 807 receives the packet from the link layer control portion 809 (step S900). The link layer control portion 809 checks if the PK header 612 exists in the received packet. In the nonexistence of the PK header, the encrypted common key control portion 807 delivers the packet to the censorship application 801 (step S901). On the other hand, in the existence of the PK header 612, the encrypted common key control portion 807 searches the public key/secret key database 808 for the secret key which has the same ID as the public key ID 623 contained in the PK header 612 (step S902).

Here, the explanatory diagram of the structure of the public key/secret key database is shown in FIG. 10. In order to acquire the secret key, public key/secret key entries 1002 which are contained in a public key/secret key database 1001 (corresponding to the public key/secret key database 808 in FIG. 8) are searched in succession. Secret key data 1013 contained in the searched public key/secret key entry 1002 is the secret key which has the same ID as the public key ID 623.

In a case where the secret key has not been found at the step S902 (step S903), the encrypted common key control portion 807 abolishes the packet (step S915). On the other hand, in a case where the secret key has been found (step S903), the encrypted common key control portion 807 decrypts the encrypted common key 622 contained in the PK header 612, by using the secret key acquired at the step 902, it removes the PK header, and it delivers the decrypted common key and the packet with the PK header removed therefrom, to the IPsec control portion 806 (step S904). Subsequently, the IPsec control portion 806 decrypts the data part 615 and TCP header 614 of the encrypted packet 610 by using the common key decrypted at the step S904 (step S907). The IPsec control portion 806 removes the ESP header from the packet decrypted at the step S907, and it delivers the resulting packet and the common key decrypted at the step S904, to the censorship application 801 via the IPv4 control portion 804 or IPv6 control portion 805, the RAW control portion 803 and the socket 802 (step S908).

In a case where the censorship application 801 confirms the content of the data part of the packet and has judged that the packet must not be transferred because the keyword of secret information is contained by way of example (step S909), it abolishes the packet (step S915). Packet data which the censorship application receives has been decrypted, and there is the advantage that the packet data part can be censored. On the other hand, in a case where the censorship application 801 has judged at the step S909 that the packet may be transferred, it delivers the packet decrypted at the step S907 and the common key decrypted at the step S904, to the IPsec control portion 806 via the socket 802, the RAW control portion 803, and the IPv4 control portion 804 or IPv6 control portion 805. The IPsec control portion 806 encrypts the data part 615 and the TCP header 614 again by using the common key (step S910). Incidentally, the IPsec control portion 806 may well hold the decrypted common key and use the held key at the encryption of the data part. In this case, the censorship application 801 may well be configured so as not to deliver the common key to the IPsec control portion 806. By the way, the IPsec control portion 806 can temporarily save the encrypted packet 610 preceding to the execution of the step S907, so as to use the saved encrypted packet instead of the execution of the encryption. Subsequently, the IPsec control portion 806 bestows the ESP header 613 on the encrypted packet (as the IPsec encrypted packet 102 in FIG. 11) (step S911). Owing to this processing, the packet comes to have the same format as that of the ordinary IPsec packet. Therefore, the PC 2d is permitted to normally receive the packet by executing the ordinary IPsec process.

The IPsec control portion 806 delivers the packet processed as stated above, to the link layer control portion 809, and the link layer control portion 809 transmits the packet to the link layer through the NIF control portion 810 so as to transmit the packet from the network interface 703a or 703b to the ISP-GW 4 (step S913). Incidentally, the ISP-GW 4 can obtain the TCP/IP packet (refer to FIG. 11) by decapsulating and decrypting the packet received from the SGW 3 through the IP network 1b (the IPsec encrypted packet in FIG. 11).

As understood from the above embodiments, according to the invention, notwithstanding that a packet has been encrypted, the content of the packet is censored in a gateway device, whereby information can be prevented from leaking out. Moreover, the quantity of information to be held in a gateway does not depend upon the number of terminals connected to the gateway, so that the invention is applicable also to a large-scale network.

What is claimed is:

1. An encrypted packet communication system comprising plural packet transmission devices, a packet transfer device of a network which includes said plural packet transmission device, and a packet reception device within another network, wherein a packet is transmitted from each of said plural packet transmission devices to said packet reception device through said packet transfer device, and wherein:

each of said packet transmission device includes:
a packet-data encrypting unit configured to encrypt a packet data part of the packet with a common key, thereby to create an encrypted data part and for creating a first encrypted header which contains common key identification information for searching for a common key for encryption between said packet transmission device and said packet reception device;
a key encrypting unit configured to encrypt the common key with a public key, thereby to create an encrypted common key and for creating a second encrypted header which contains identification information of the encrypted common key and the public key; and
a transmitter unit configured to transmit an encrypted packet which contains the first encrypted header, the second encrypted header and the encrypted data part, to said packet transfer device; and said packet transfer device includes:
a public key/secret key database in which at least one public key and at least one secret key are stored in correspondence with the public-key identification information;
a receiver unit configured to receive the encrypted packet from said packet transmission device and, in a case where the received packet contains the second encrypted header, for obtaining a secret key corresponding to the public key from the public key/secret key database, on the basis of the identification information of the public key in the second encrypted header, in a case where the secret key has been found, for obtaining the common key by decrypting the encrypted common key contained in the second encrypted header, with the secret key, and for deleting the second encrypted header from the encrypted packet and, on the other hand, in a case where the secret key has not been found, for abolishing the packet;
a holding unit configured to hold the decrypted common key and for saving the encrypted packet from which the second encrypted header is deleted;
a packet-data decrypting unit configured to decrypt the encrypted data part of the encrypted packet with the obtained common key, thereby to obtain the packet data part, and for further deleting the first encrypted header from the encrypted packet;
a censor unit configured to censor the packet data part, thereby to judge if the packet containing the packet data part may be transferred;
a re-encrypting unit configured, in case of the judgment that the packet containing the packet data part must not be transferred, for abolishing the packet and, on the other hand, in case of the judgment that the packet containing the packet data part may be transferred, for obtaining the encrypted packet from which the second encrypted header is deleted and which contains the encrypted data part and the first encrypted header containing the common-key identification information, from the holding unit; and a network transmitter unit configured to transmit the encrypted packet from which the second encrypted header is deleted and which contains the encrypted data part and the first encrypted header, to the other network.

2. An encrypted packet communication system as defined in claim 1, wherein:

said packet transmission device includes a security policy database which stores therein at least one security policy that contains originating-source identification information and/or destination identification information; and the security policy database is searched on the basis of originating-source identification information and/or destination identification information of the packet to-be-transmitted, and the first encrypted header and/or the second encrypted header are/is provided on the packet when the packet corresponds to the security policy.

3. An encrypted packet communication system as defined in claim 1, wherein:

said packet transmission device includes a security policy database which stores therein at least one security policy that contains an application name; and an application name which is contained in process information that is managed by an OS is searched for as to the packet to-be-transmitted, the security database is searched for the security policy by using a name of an application which has transmitted or created the packet, and the first encrypted header and/or the second encrypted header are/is provided on the packet when the packet corresponds to the security policy.

4. An encrypted packet communication system as defined in claim 2 or 3, further comprising:

a common-key database which can store at least one common key therein;

wherein the security policy contains a pointer for identifying the common key, and an acquiring unit configured to acquire the common key from the security policy and via the pointer, and for providing the first encrypted header.

5. An encrypted packet communication system as defined in claim 2 or 3, further comprising:

a public-key database which can store at least one public key therein;

wherein the security policy contains a pointer for identifying the common key, and an acquiring unit configured to acquire the public key from the security policy and via the pointer, and for providing the second encrypted header.

* * * * *